US009367169B2

(12) United States Patent
Tan

(10) Patent No.: US 9,367,169 B2
(45) Date of Patent: Jun. 14, 2016

(54) METHOD, CIRCUIT, AND SYSTEM FOR HOVER AND GESTURE DETECTION WITH A TOUCH SCREEN

(71) Applicant: STMICROELECTRONICS ASIA PACIFIC PTE LTD, Singapore (SG)

(72) Inventor: Kien Beng Tan, Singapore (SG)

(73) Assignee: STMICROELECTRONICS ASIA PACIFIC PTE LTD, Singapore (SG)

( * ) Notice: Subject to any disclaimer, the term of this patent is extended or adjusted under 35 U.S.C. 154(b) by 43 days.

(21) Appl. No.: 14/231,408

(22) Filed: Mar. 31, 2014

(65) Prior Publication Data

US 2015/0277649 A1 Oct. 1, 2015

(51) Int. Cl.
*G06F 3/041* (2006.01)
*G06F 3/0488* (2013.01)

(52) U.S. Cl.
CPC .......... *G06F 3/0416* (2013.01); *G06F 3/04883* (2013.01)

(58) Field of Classification Search
CPC . G06F 3/0416; G06F 3/04883; G06F 1/1686; G06F 17/276; G06F 3/013; G06F 3/016
See application file for complete search history.

(56) References Cited

U.S. PATENT DOCUMENTS

| 2007/0259716 | A1* | 11/2007 | Mattice | G06F 3/013 463/36 |
| 2011/0291945 | A1* | 12/2011 | Ewing, Jr. | G06F 1/1686 345/173 |
| 2014/0062875 | A1* | 3/2014 | Rafey | G06F 17/276 345/158 |

* cited by examiner

*Primary Examiner* — Kevin M Nguyen
(74) *Attorney, Agent, or Firm* — Seed IP Law Group PLLC

(57) ABSTRACT

According to one embodiment of the present disclosure, a touch controller is adapted to be coupled to a touch screen and to a motion sensor. The touch controller is operable in response to a signal from the motion sensor indicating a first motion to switch from a hover event sensing mode of operation to a gesture event sensing mode of operation. In one embodiment, the touch controller is operable in the hover event sensing mode of operation to detect a first hover event and is thereafter operable, in response to the signal from the motion sensor indicating a first motion has occurred, to switch to the gesture event sensing mode of operation and detect a first gesture event.

22 Claims, 4 Drawing Sheets

METHOD, CIRCUIT, AND SYSTEM FOR HOVER AND GESTURE DETECTION WITH A TOUCH SCREEN

TECHNICAL FIELD

The present disclosure relates generally to touch screens and relates more specifically to the detection of different types of interface inputs on a touch screen.

BACKGROUND

Touch screens are present in many different types of common modern electronic devices, such as smart phones, tablet computers, portable music and video devices, personal digital assistants, portable gaming devices, and so on. In these electronic devices the touch screen is part of the user interface of the device. The touch screen typically includes a touch display and sensors, and a touch controller is coupled to the touch screen. The sensors are typically some sort of transparent sensor array, such as an ultrasonic, resistive, vibration, or capacitive sensor array, or a combination thereof, which is attached to or formed as an integral part of the touch display. When a user touches a surface of touch display and thereby touches the sensor array, either with a finger or a stylus, for example, the sensor array generates corresponding electronic sensor signals that are provided to the touch controller. From these sensor signals, the touch controller determines the type of "touch event" made by the user on the touch screen and provides this information to processing circuitry in the electronic device. The processing circuitry operates in response to this information to allow a user to control the electronic device or an application running on the processing circuitry through these touches of the touch screen.

Current touch screens also provide three-dimensional sensing, where the sensing is termed "three-dimensional" because user or "interface inputs" in the form of a user's finger, stylus, or other device being present above but not in contact with the surface of the touch display can also be detected, along with interface inputs in the form of "touch events" directly on the surface of the touch display. The term "interface input" is used herein to refer generally to all types of actions by a user's finger or other device that can be sensed by a touch screen. The terms "touch event" or "touch" are used to mean an interface input, whether stationary or moving, where the user's finger or other device is directly in contact with the surface of the touch display. The terms "hover event" or simply "hover" are used to mean an interface input where the user's finger or other device is stationary or moving (e.g., during a hover zoom interface input the user's fingers would be moving) and within a certain "sensing range" SR from the surface of the touch display, but is not actually in contact with or touching the surface. The sensing range SR is a distance orthogonal to the surface of the touch display within which the user' finger or other device will be reliably sensed by the touch screen, as will be appreciated by those skilled in the art. Finally, the terms "gesture event" or "gesture" are used to mean an interface input where the user's finger or other device is moving in a predefined constrain and is within the sensing range SR of the touch display. Examples of predefined constrains are the user's finger moving faster than normal over a specified distance and the user's finger drawing, in air, a certain pattern, such as a 'Z-shaped' pattern. Thus, for both gesture and hover events the user's finger or other device is not actually in contact with or touching the surface of the touch display. Finally, note that for the sake of brevity, in the remainder of the present application a user's finger will be used to describe the device that is being sensed by the touch screen. One skilled in the art will appreciate, however, that any suitable type of device, such as a stylus, tablet pen, or other type of device, may be used to generate the interface input (i.e., touch event, hover event, or gesture event) that is being detected.

In both hover and gesture events, the user's finger is within the sensing range SR above the surface of the touch display and the type of event (i.e., either hover or gesture) is differentiated by the predefined constrains. The touch screen and controller must, of course, be able to reliably distinguish between these two types of events and detect whether the event is a hover event or a gesture event. One approach to doing so is for the touch screen to utilize different sensing technologies to sense hover and gesture events. For example, one such approach utilizes capacitive sensing technology to detect hover events and infrared (IR) sensing technology to detect gesture events. With this approach, the touch screen obviously must include both capacitive sensors and IR sensors. There is a need for improved methods, circuits, and systems for reliably sensing and distinguishing between hover and gesture events with a touch screen.

SUMMARY

According to one embodiment of the subject matter of the present disclosure, a touch controller is adapted to be coupled to a touch screen and to a motion sensor. The touch controller is operable in response to a signal from the motion sensor indicating a first motion to switch from a hover event sensing mode of operation to a gesture event sensing mode of operation. In one embodiment, the touch controller is operable in the hover event sensing mode of operation to detect a first hover event and is thereafter operable, in response to the signal from the motion sensor indicating a first motion has occurred, to switch to the gesture event sensing mode of operation and detect a first gesture event.

According to another embodiment, a method of controlling operation of an electronic device including a touch screen includes switching between a first event sensing mode of operation and a second event sensing mode of operation responsive to sensed motion of the electronic device. The first even sensing mode of operation may detect hover events and the second event sensing mode of operation may detect gesture events.

DETAILED DESCRIPTION

Figure 1:
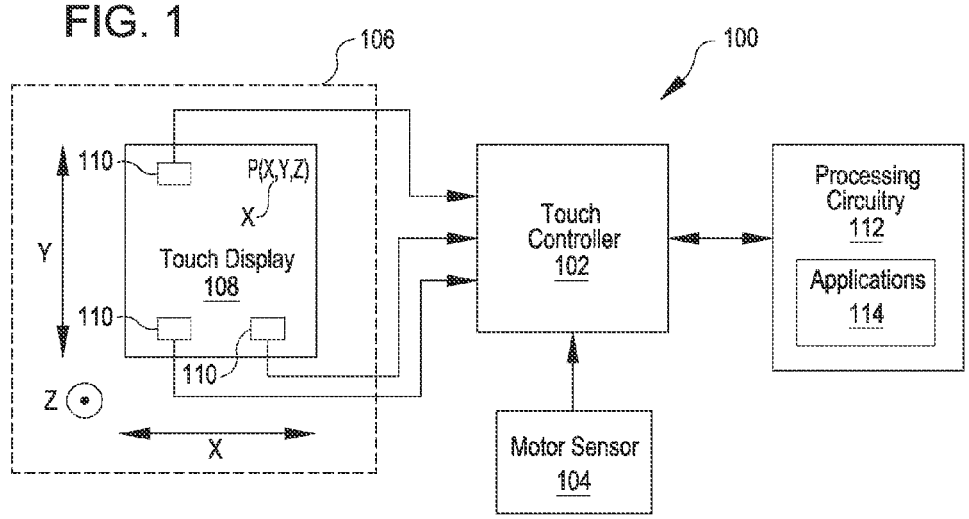
FIG. 1 is a functional block diagram of an electronic device including a touch screen and touch controller operable to distinguish between hover and gesture events according to one embodiment of the subject matter of the present disclosure.

FIG. 1 is a functional block diagram of an electronic device 100 including a touch controller 102 that is operable in response to a motion signal MS from a motion sensor 104 to switch between the detection of hover events and gesture events on a touch screen 106, as will be described in more detail below. This embodiment enables a single type of sensing technology or sensor, such as capacitive sensors, to be utilized in the touch screen 106 to detect hover events in a hover event sensing mode of operation and to detect gesture events in a gesture event sensing mode of operation, with the operating mode being changed in response to the motion signal MS from the motion sensor 104. The motion sensor 104 may be a conventional micro electromechanical systems (MEMS) device, such as an accelerometer, which is typically already contained in many electronic devices, such as smart phones. Accordingly, where the electronic device 100 is a smart phone, the motion sensor 104 will typically already be contained in the device and thus no additional component is required. Instead, the motion signal from the existing accelerometer, which is typically used for Global Positioning System (GPS) functionality of the device, can also be used to control the switching between hover and gesture detection modes of operation according to embodiments of the present disclosure, as will be described in more detail below.

In the following description, certain details are set forth in conjunction with the described embodiments to provide a sufficient understanding of the present disclosure. One skilled in the art will appreciate, however, that the other embodiments may be practiced without these particular details. Furthermore, one skilled in the art will appreciate that the example embodiments described below do not limit the scope of the present disclosure, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. Finally, the operation of well-known components and/or processes has not been shown or described in detail below to avoid unnecessarily obscuring the present disclosure.

The touch screen 106 includes a touch display 108 and a number of touch sensors 110 positioned on the touch screen to detect touch points P(X,Y,Z), with only three touch sensors being shown merely by way of example and to simply the figure. There are typically many more touch sensors 110. These touch sensors 110 are usually contained in a transparent sensor array that is then mounted on a surface of the touch display 108. The number and locations of the sensors 110 can vary as can the particular technology or type of sensor, with typical sensors being resistive, vibration, capacitive, or ultrasonic sensors. In the embodiments described herein, the sensors are considered to be capacitive sensors by way of example.

In operation of the touch screen 106, a user generates a touch point P(X,Y,Z) through a suitable interface input, such as a touch event, hover event, or gesture event, which were previously described above. Briefly, a touch event is an interface input where the user's finger is actually touching the surface of the touch display 108 while in hover and gesture events, the user's finger is within a sensing range SR above the surface of the touch display 108 but is not touching the surface, and in a hover event the finger is stationary or moving while in a gesture event the finger is moving in a singular or plural predefined constrains. The X-axis, Y-axis, and Z-axis are shown in FIG. 1. The Z-direction is out of the page and orthogonal to the surface (i.e., the XY plane) of the touch display 108. Thus, for a given touch point P(X,Y,Z), the X and Y values indicate the location of the touch point on the surface of the touch display 108 while the Z value indicates the distance of the user's finger from the surface or whether the finger is within a sensing range SR (Z=0 for touch events). A touch point P(X,Y,Z) is illustrated in FIG. 1.

In response to a touch point P(X,Y,Z), the sensors 110 generate respective signals that are provided to the touch controller 102 which, in turn, processes these signals to generate touch information for the corresponding touch point. The touch information that the touch controller 102 generates for each touch point P(X,Y,Z) includes location information and event information identifying the type of interface input, namely whether the touch point P(X,Y,Z) corresponds to a touch event, hover event, gesture event, or some other type of event recognized by the touch controller. The location information includes an X-coordinate and a Y-coordinate that together define the XY location of the touch point P(X,Y,Z) on the surface of the touch display 108.

Where the sensors 110 are capacitive sensors, the sensors are typically formed as an array of sensors from transparent patterned orthogonal conductive lines (not shown) formed on the surface, or integrated as part of, the touch display 108. The intersections of the conductive lines form individual sensors or "sensing points," and the touch controller 102 scans these sensing points and processes the generated signals to identify the location and type of touch point or points P(X,Y,Z). The detailed operation of such an array of capacitive sensors 110 and the touch controller 102 in sensing the location and type of touch point P(X,Y,Z) (i.e., touch event, hover event, or gesture event) will be understood by those skilled in the art, and thus, for the sake of brevity, this operation will not be described in more detail herein.

The electronic device 110 further includes processing circuitry 112 coupled to the touch controller 102 to receive the generated touch information, including the location of the touch point P(X,Y,Z) and the corresponding type of detected interface event (touch event, hover event, gesture event) associated with the touch point. The processing circuitry 112 executes applications or "apps" 114 that control the electronic device 100 to implement desired functions or perform desired tasks. These apps 114 executing on the processing circuitry 112 interface with a user of electronic device 110 through the touch controller 102 and touch screen 106, allowing a user to start execution of or "open" the app and thereafter interface with the app through the touch display 108.

In operation, the touch controller 102 and touch screen 106 operate in combination to sense interface inputs on the touch display 108 and to provide touch information associated with the interface input to the processing circuitry. In sensing of the interface inputs, the touch screen 106 and touch controller 102 operate to detect a touch point P(X,Y,Z) and to determine the type of the interface input, namely whether the input is a touch event, hover event, or gesture event. The touch controller 102 processes the sensor signals from the sensors 110 in sensing on the interface inputs and, as mentioned above, the touch controller 102 also receives the motion signal MS from the motion sensor 104 and utilizes this motion signal in switching between the hover and gesture events modes of operation, as will now be described in more detail.

The touch controller 102 processes the sensor signals from the sensors 110 to sense a touch point P(X,Y,Z) on the touch display 108 and determine the type of event associated with the touch point. An interface input accordingly includes the touch point P(X,Y,Z), which identifies the location of the input, as well as the type of event. If the touch controller 102 senses a touch point P(X,Y,Z) and determines that the associated event is a touch event, then the touch controller 102 operates in a conventional way to process the sensor signals from sensors 108 and provide corresponding touch information to the processing circuitry 112.

When the touch controller 102 processes the sensor signals from the sensors 110 and detects a touch point P(X,Y,Z) that is within the sensing range SR from the surface of the touch display 108 but not directly in contact with the surface, the touch controller initially determines this interface input is a hover event. The touch controller 102 and touch screen 106 thereafter operate in the hover event sensing mode of operation to control the device 100 in response the sensed hover event. In the hover event sensing mode, various actions may be performed in response to the detected hover event. For example, when the user's finger is positioned over an icon on the screen (i.e., the icon is located at (X1,Y1) and the touch point P(X1,Y1,Z) is detected for the hover event), then the hover event may cause the icon to be magnified or "zoom in" on the icon. Others actions includes showing the contents contained in a folder where the icon is a folder icon, or showing more information about a "contact" where the icon represents a contact of the user's. Obviously still other actions could be taken in response to a sensed hover event, as will be appreciated by those skilled in the art.

The touch controller 102 and touch screen 106 continue operating in the hover event sensing mode of operation to control the device 100 until the motion sensor 104 senses a motion of the electronic device 100 and generates the motion signal MS indicating this sensed motion. In response to the motion signal MS indicating the sensed motion has been detected, the touch controller 102 changes or switches the mode of operation to the gesture event sensing mode of operation. Once in the gesture event sensing mode of operation, the touch controller 102 and touch screen 106 operate to detect gesture events by the user of the electronic device 100. The specific type and number of gesture events that can be detected in gesture event sensing mode may vary. One example of a gesture event is a "swipe gesture" in which a user moves one of his or her fingers, typically the thumb, in a left-to-right or right-to-left motion across the touch display 108, as will be described in more detail below with reference to FIGS. 3 and 5. Such a swipe gesture is typically utilized to change or flip pages in a document being displayed on the touch display 108.

The sensed motion that is sensed or detected by the motion sensor 104 may be a particular motion of the electronic device 100 or may be any sensed motion of device. In one embodiment, the sensed motion is a downward tilt motion of the electronic device 100 and the touch controller 102 processes the motion signal MS to sense this particular motion to switch the mode of operation to the gesture event sensing mode of operation. The MS signal will have particular characteristics indicating the downward tilt motion of the electronic device 100. In this way the user must make this particular motion with the electronic device 100 to cause the motion sensor 104 to sense the downward tilt motion and thereby change the mode of operation of the touch controller 102 and touch display 108 to the gesture event sensing mode of operation.

The touch controller 102 and touch screen 106 continue operating in the gesture event sensing mode of operation to control the device 100 in response to sensed swipe gestures until the motion sensor 104 again senses a motion of the electronic device. Once again, in response to this sensed motion the motion sensor 104 generates the motion signal MS indicating the sensed motion, and in response to the motion signal the touch controller 102 changes or switches the mode of operation back to the hover event sensing mode of operation. The touch controller 102 and touch screen 106 operate in the hover event sensing mode to detect hover events by the user of the electronic device 100, as previously described above.

In one embodiment, the sensed motion to switch the mode of operation from the gesture event sensing mode back to the hover event sensing mode is an upward tilt motion of the electronic device 100. The touch controller 102 once again processes the motion signal MS to sense this particular motion. The MS signal will have particular characteristics indicating the upward tilt motion of the electronic device 100 and the user must make this particular motion with the electronic device to cause the motion sensor 104 to sense an upward tilt motion and thereby change the mode of operation of back to the hover event sensing mode of operation. The upward and downward tilt motions will be described in more detail below with reference to FIGS. 5-7. Also note that in the present description the touch controller 102 and touch display 108 may in some instances be described as operating in the hover or gesture event sensing mode and, alternatively, in other instances the electronic device 100 may be described as operating in the hover or gesture event sensing mode. These descriptions are used interchangeably in the present description and are accordingly equivalent.

Figure 2:
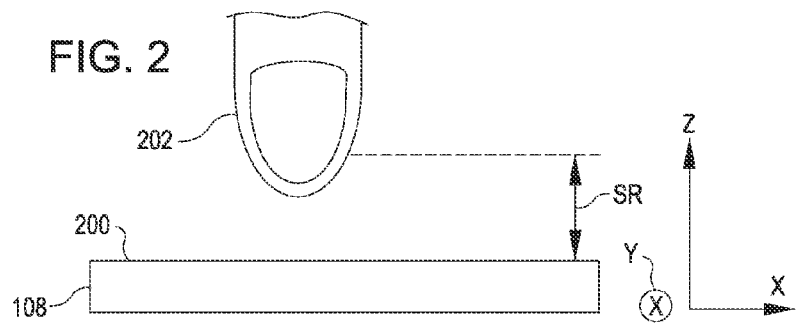
FIG. 2 is a side view of the touch display of FIG. 1 illustrating a hover event that is detected by the touch screen and touch controller of FIG. 1.

FIG. 2 is a side view of the touch display 108 of FIG. 1 illustrating a hover event that is detected by the touch screen 106 and touch controller 102 of FIG. 1. As seen in FIG. 2, the Z-direction is orthogonal to a surface 200 of the touch display 108 and the sensing range SR is illustrated. A user's finger 202 is shown in a stationary position above the surface 200. The finger 202 is also within the sensing range SR of the touch display 108. Thus, the finger 202 is performing a hover event and will be detected as such by the touch display 108 and touch controller 102 (FIG. 1). During the hover event sensing mode of operation, the user may move his finger from one location to another over the touch display 108, but the user must end up leaving the finger relatively stationary over a desired icon for a hover event to be detected at the location of the icon. As previously described, the hover event may cause the icon to be magnified or "zoom in" on the icon, or may show the contents of the icon on the touch display 108 where the icon is a folder or contact of the user's stored on the electronic device 100.

Figure 3:
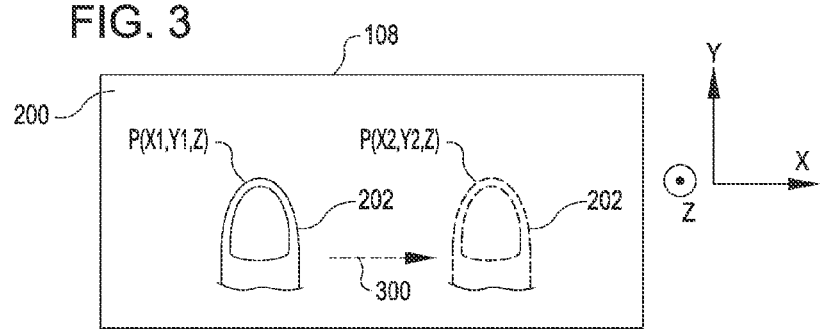
FIG. 3 is a top view of the touch display of FIG. 1 illustrating a gesture event that is detected by the touch screen and touch controller of FIG. 1.

FIG. 3 is a top view of the touch display 108 of FIG. 1 illustrating a gesture event that is detected by the touch screen 106 and touch controller 102 of FIG. 1. As previously described, with a gesture event the user's finger is within the sensing range SR above the surface 200 of the touch display 108 (as illustrated in FIG. 2) and is not touching the surface, and the finger is not moving. This movement is illustrated in FIG. 3 through the dotted lines illustrating a second location of the user's finger 202 and an arrow 300 illustrating movement of the finger from left to right across the display 108. The gesture event illustrated in FIG. 3 is a swipe gesture as previously described above.

For the illustrated swipe gesture, initially the user's finger 202 is at a first position or location (X1,Y1) over the display 108, which corresponds to the position on the left side in FIG. 3. A touch point P(X1,Y1,Z) is illustrated for this initial location on the left side of display 108, with the X and Y coordinates (X1,Y1) indicating this initial location of the user's finger 202. The user then moves or "swipes" his finger 202 from left to right across the display 108 as illustrated by the arrow 300. Through this swipe gesture the user's finger 202 ends up at a second location (X2,Y2) as illustrated on the right-hand side of the display 108 in FIG. 3, with a touch point P(X2,Y2,Z) being shown for the second location. Note the precise movement or swipe of the user's finger 202 can vary. For example, the user can also swipe his finger 202 from an initial position on the right of the display 108 across the display to the left. This left-to-right swipe gesture may cause the prior page in a document to be displayed while a right-to-left swipe gesture results in the next page in the document being displayed, for example.

Any of a variety of methods can be used to achieve a swipe gesture, with FIG. 2 representing one example. Another method is where the user makes a circular motion in space, meaning without touching the surface 200 of the touch display 108 and within the sensing range SR from the surface. In this approach, each such circular motion corresponds to a gesture event with each such gesture event resulting in a corresponding action, such as going to the next page or the previous page in a document that is being displayed on the touch display 108. In an alternative or complimentary approach for sensing gesture events, detection of a right-to-left swipe gesture above the surface 200 within the sensing range SR is "blocked" for a specified duration after the detection of a left-to-right swipe gesture. The converse is true also in this approach, namely the detection of a left-to-right swipe gesture above the surface 200 within the sensing range SR is "blocked" for a specified duration after the detection of a right-to-left swipe gesture.

Figure 4:
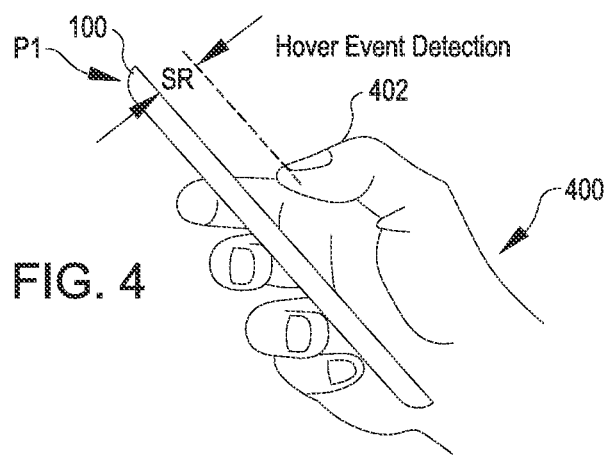
FIG. 4 is a side view illustrating the operation of the electronic device of FIG. 1 in a first position at which a hover event is detected.
Figure 5:
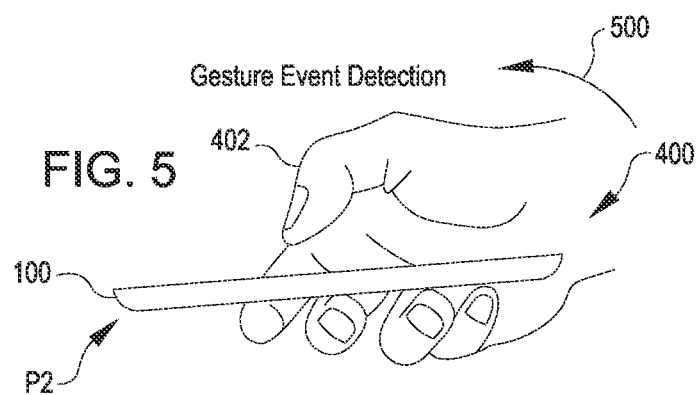
FIG. 5 is a side view illustrating motion of the electronic device from the first position in FIG. 4 to a second position at which a hover event is detected.
Figure 6:
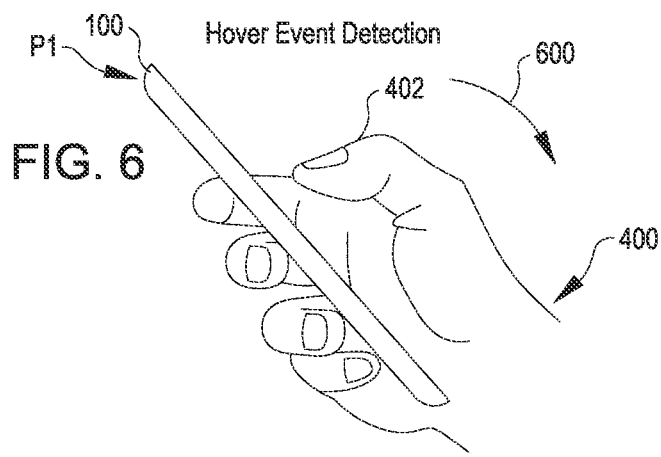
FIG. 6 is a side view illustrating motion of the electronic device from the second position in FIG. 5 back to the first position of FIG. 4 at which another hover event is detected.

FIGS. 4-6 are side views illustrating in more detail the downward and upward tilt motions of the electronic device 100 of FIG. 1 that function to switch between the hover event and gesture event sensing modes of operation according to one embodiment of the present disclosure. FIG. 4 is a side view illustrating the operation of the electronic device 100 of FIG. 1 in a first position P1 at which a hover event is initially detected. In the first position P1, the electronic device 100, which in this example is a smart phone, is held with a user's right hand 400 as it would be during normal use of the electronic device while the user is viewing the touch display 108 (not shown in FIG. 4). Thumb 402 of the user's right hand 400 is shown in a stationary position within the sensing range SR above the surface of the touch display 108. The touch screen 106 and touch controller 102 initially operate in the hover event sensing mode of operation and detect the hover event generated by user's thumb 402. The electronic device 100 then takes the appropriate action in response to the detected hover event.

Referring now to FIG. 5, a side view of the electronic device 100 is again shown in a second position P2 after the user has performed a downward tilt motion of the electronic device, which is illustrated in FIG. 5 through the arrow 500. The user rotates the device 100 downward through the downward tilt motion 500 in order to change the mode of operation of the device from the hover event sensing mode to the gesture event sensing mode of operation. Thus, the downward tilt motion 500 changes the position of the electronic device 100 from the first position P1 of FIG. 4 to the second position P2 in FIG. 5. In response to this change in position or movement of the electronic device from the position P1 to P2, the motion sensor 104 (FIG. 1) generates the motion signal MS indicating this motion or movement of the device. The touch controller 102 (FIG. 1) senses this generated MS signal and changes the mode of operation of the electronic device from the hover event sensing to the gesture event sensing mode. At this point, the user would then perform the desired gesture events via his thumb 402 in the gesture event sensing mode of operation. For example, the user may perform a swipe gesture to advance to the next page in a document being displayed on the touch display 108 of the electronic device 100.

In the first position P1, the electronic device 100, which in this example is a smart phone, is held with a user's right hand 400 as it would be during normal use of the electronic device while the user is viewing the touch display 108 (not shown in FIG. 4). Thumb 402 of the user's right hand 400 is shown in a stationary position within the sensing range SR above the surface of the touch display 108. The touch screen 106 and touch controller 102 initially operate in the hover event sensing mode of operation and detect the hover event generated by user's thumb 402. The electronic device 100 then takes the appropriate action in response to the detected hover event. The electronic device 100 need be place precisely in the position P2 to change the mode of operation, but the change in positions between the position P1 and P2 must be sufficient to cause the motion sensor 104 to generate the required motion signal MS.

Now referring to FIG. 6, after the user has perform the desired gesture event or events, such as a swipe gesture, with the device 100 in the second position P2 of FIG. 5, the user performs an upward tilt motion of the electronic device, which is represented through an arrow 600 in FIG. 6. This upward tilt motion 600 results in the electronic device being returned to approximately the first position P1 shown in FIG. 4. In response to this change in position or movement of the electronic device from the second position P2 back to the first position P1 through the upward tilt motion 600, the motion sensor 104 (FIG. 1) generates the motion signal MS indicating this motion or movement of the device. The touch controller 102 (FIG. 1) once again senses this generated MS signal and changes the mode of operation of the electronic device from the gesture event sensing mode in FIG. 5 back to the gesture event sensing mode in FIG. 6. At this point, the user would then perform the desired hover event or events via his thumb 402 in the hover event sensing mode of operation. The electronic device 100 need not be returned precisely to the first position P1 from the second position P2 to switch the mode of operation back to the hover event sensing mode, but once again the change in position must be sufficient to cause the motion sensor 104 to generate the required motion signal MS.

Figure 7:
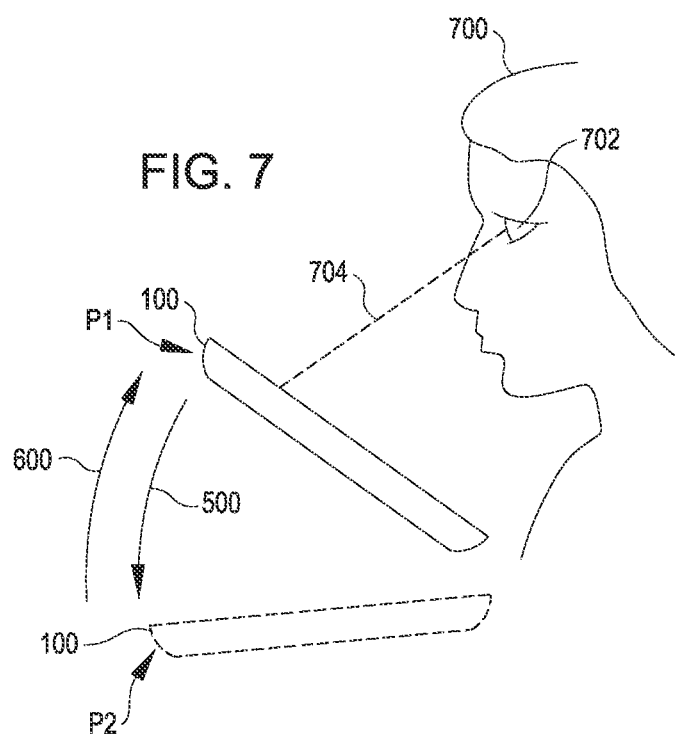
FIG. 7 is a side view illustrating operation of the electronic device relative to a user controlling the device during the operations of FIGS. 4-6.

FIG. 7 is a side view illustrating operation of the electronic device 100 relative to a user 700 controlling the device during the operations of FIGS. 4-6. The electronic device 100 is shown initially in the first position P1. As illustrated in FIG. 7, in the first position P1 the user 700 can view what is being displayed on the touch display 108 (not shown in FIG. 7). The eyes 702 (one shown in FIG. 7) of the user 700 have a direct line of sight, which is represented by the dotted line 704, to view what is being displayed on the touch display 108 of the electronic device 100 when the device is in the first position P1. As previously described, with the electronic device 100 in the first position P1 the device operates in the hover event sensing mode of operation.

To switch from the hover event sensing mode to the gesture event sensing mode, the user 700 performs the downward tilt motion 500 of the electronic device 100 to change the position of the device from the first position P1 to the second position P2. The electronic device 100 is represented with dotted lines in the second position P2 in FIG. 7. With the electronic device 100 in the second position, the user 700 controls the device in the gesture event sensing mode as previously described. Note that as illustrated in FIG. 7 in the second position P2 the upper surface of the electronic device may actually be tilted away from the user's eyes 702 such that the user may not be able to see at all or may not be able to see clearly what is currently being displayed on the electronic device. This may not be detrimental to the operation of the device 100 by the user 700 so long as the gesture event being detected when the device is operating in the gesture event sensing mode in the position P2 does not require the user to clearly view what is being displayed on the device. This is true, for example, where the gesture event to be detected when the device 100 is operating in the gesture event sensing mode at position P2 is a swipe gesture. To switch from the gesture event sensing mode back to the hover event sensing mode, the user 700 performs the upward tilt motion 600 of the electronic device 100 to change the position of the device from the second position P2 back to approximately the first position P1. With the electronic device 100 back in the first position P1, the user 700 again controls the device in the hover event sensing mode as previously described.

Figure 8:
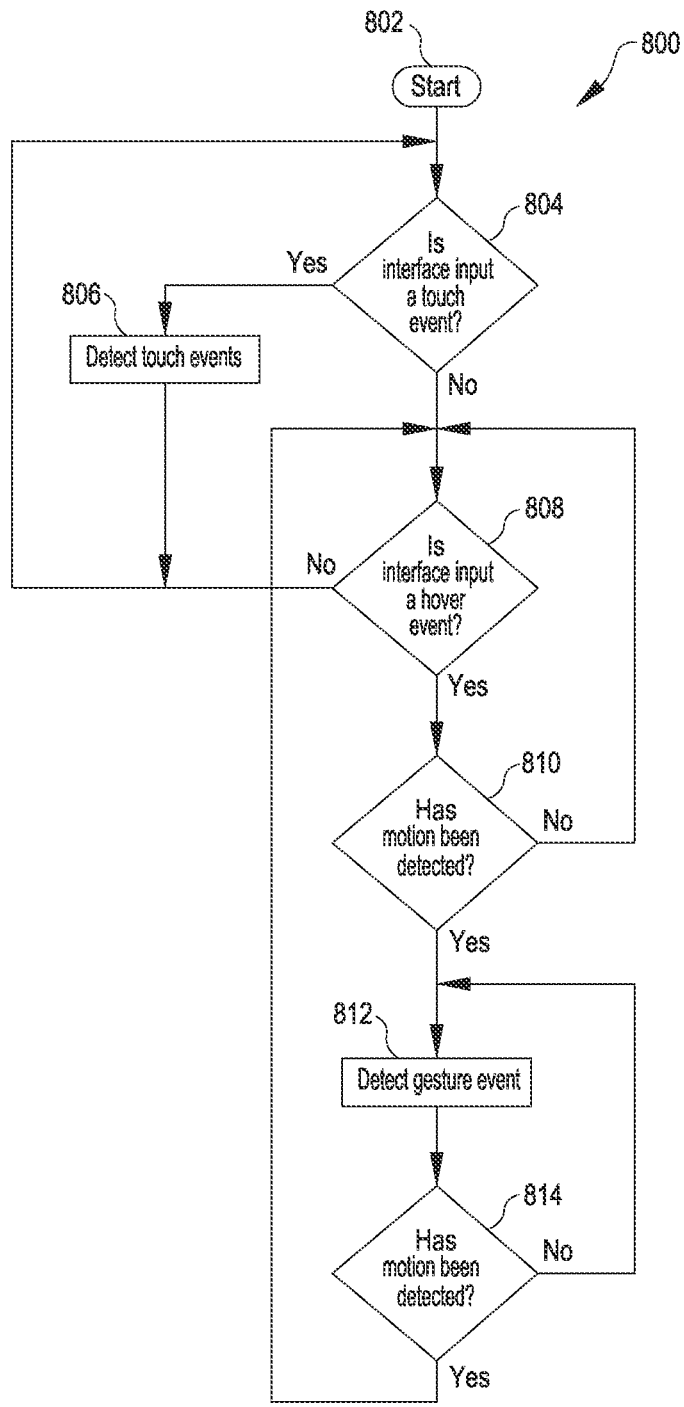
FIG. 8 is a flow chart illustrating the process executed by the electronic device of FIG. 1 according to one embodiment of the subject matter of the present disclosure.

FIG. 8 is a flow chart illustrating the process executed by the electronic device of FIG. 1 according to one embodiment of the subject matter of the present disclosure. The process begins in step 802 and proceeds immediately to step 804 and determines whether a detected interface input is a touch event. When the determination in step 804 is positive, the process proceeds to step 806 and detects touch events from the user and controls the electronic device 100 in response to such detected touch events in a conventional way. When no such touch events are being input by the user, the process then goes from step 806 back to step 804 and awaits the detection by the user of an interface input.

When the determination in step 804 is negative, the process goes to step 808 and determines whether the detected interface input is a hover event input by the user. When the determination in step 808 is negative, the process goes back to step 804 awaits detection of another interface input by the user. When the determination in step 808 is positive, the process goes to step 810 and determines whether motion of the electronic device 100 has been detected. More specifically, in step 810 the process determines whether the motion sensor 104 (FIG. 1) has generated the motion signal MS indicating that the electronic device 100 has been moved as previously described with reference to FIGS. 4-7. When no such motion is detected, the determination in step 810 is negative and the process returns to step 808 and continues detecting hover events in the hover event sensing mode of operation.

When the determination in step 810 is positive, this indicates the required motion of the electronic device 100 as previously described with reference to FIGS. 4-7 has been detected. In this situation, the process goes to step 812 and changes the mode of operation to the gesture event sensing mode. In step 812 the process then detects a gesture event as previously described. From step 812 the process goes to step 814 and once again determines whether the required motion of the electronic device 100 has been detected. As long as the determination in step 814 is negative, the process returns to step 812 and continues operating in the gesture event sensing mode of operation. When the determination in step 814 is positive, meaning the required motion of the electronic device 100 has been sensed, the process returns to step 808 and changes back to the hover event sensing mode of operation. If a user stops providing inputs in either the hover event or gesture event sensing modes of operation in steps 808 and 812, respectively, the process after a certain duration "times out" and returns to step 804 and waits for another interface input to be detected.

The type of applications or "app" 114 executing on the processing circuitry 112 will vary depending on the type of electronic device 100. Where the electronic device 100 is a cell or smart phone or a tablet computer, for example, the applications 114 can include a wide variety of different types of applications, such as music applications, email applications, video applications, game applications, reading applications, and so on.

One skilled in the art will understood that even though various embodiments and advantages of the present disclosure have been set forth in the foregoing description, the above disclosure is illustrative only, and changes may be made in detail, and yet remain within the broad principles of the invention. For example, some of the components described above may be implemented using either digital or analog circuitry, or a combination of both, and also, where appropriate, may be realized through software executing on suitable processing circuitry. Therefore, the present invention is to be limited only by the appended claims.

What is claimed is:

1. A touch controller configured to be coupled to a touch screen and to be coupled to a motion sensor, the touch controller further configured, in response to a signal from the motion sensor indicating a first motion, to switch from a hover event sensing mode of operation to a gesture event sensing mode of operation, wherein the touch controller is configured, in the hover event sensing mode of operation, to detect a first hover event and is configured, in response to the signal from the motion sensor indicating a first motion has occurred, to switch to the gesture event sensing mode of operation and detect a first gesture event, wherein the first hover event corresponds to an interface input where an input device is stationary or moving and within a sensing range from a surface of a touch display of the touch screen but is not in contact with the surface, and wherein the first gesture event corresponds to an interface input where the input device is moving in a predefined constrain and is within the sensing range of the surface but not in contact with the surface.

2. The touch controller of claim 1, wherein the input device comprises a finger of a user.

3. The touch controller of claim 1, wherein the first motion comprises a downward tilt motion.

4. The touch controller of claim 3 further configured, in response to the signal from the motion sensor indicating a second motion has occurred, to switch back to the hover event sensing mode of operation and detect a second hover event.

5. The touch controller of claim 4, wherein the second motion comprises an upward tilt motion.

6. The touch controller of claim 1, wherein the touch controller is configured to receive a signal from the touch screen indicating changes in capacitance at sensing points on the touch screen.

7. The touch controller of claim 1, wherein the signal from the motion sensor indicates an acceleration of an electronic device containing the touch controller, touch screen, and motion sensor.

8. A touch controller configured to receive sensor signals from a capacitive touch screen and configured to receive a motion signal from a motion sensor, the touch controller configured, in response to the sensor signals and the motion signal, to detect hover events and gesture events applied to the capacitive touch screen, a hover event being an interface input to the touch screen in which an input device is stationary or moving and is within a sensing range from a surface of a touch display that is part of the touch screen but is not in contact with the surface, and a gesture event being an interface input to the touch screen in which the input device is moving in a predefined constrain and is within the sensing range of the surface but is not in contact with the surface, and wherein the touch controller is configured detect hover events and gesture events based on only the sensor signals and the motion signal.

9. The touch controller of claim 8, wherein the touch controller is configured to detect a hover event in response to the sensor signals and thereafter, in response to the motion signal, the touch controller is configured to detect a gesture event in response to the sensor signals.

10. The touch controller of claim 8, wherein the touch controller is further configured to detect touch events in response to the sensor signals and independent of the motion signal from the motion sensor.

11. An electronic device, comprising:
   processing circuitry;
   a touch screen configured to generate sensor signals indicating an interface input applied to a surface of a touch display that is part of the touch screen;
   a motion sensor configured to generate a motion signal indicating movement of the electronic device;
   a touch controller coupled to the processing circuitry and the touch screen, the touch controller configured, in response to the sensor signals and the motion signal, to sense hover and gesture events where a hover event is an interface input in which an input device is stationary or moving and is within a sensing range from the surface but where the input device is not in contact with the surface, and where a gesture event is an interface input in which the input device is moving in a predefined constrain and is within the sensing range of the surface but where the input device is not in contact with the surface.

12. The electronic device of claim 11, wherein the processing circuitry comprises smart phone processing circuitry.

13. The electronic device of claim 12, wherein the touch screen comprises a capacitive touch screen.

14. The electronic device of claim 13, wherein the motion sensor comprises a microelectromechanical systems (MEMS) device.

15. The electronic device of claim 14, wherein the MEMS device comprises an accelerometer.

16. The electronic device of 14, wherein the MEMS device comprises a gyroscope.

17. A method of detecting interface inputs with a touch screen contained in an electronic device, the method comprising:
   detecting a hover event input to the touch screen, wherein the hover event is an interface input in which an input device is stationary or moving and is within a sensing range from a surface of the touch screen but is not in contact with the surface;
   detecting a first motion of the electronic device; and
   detecting a gesture event input to the touch screen after the first motion of the electronic device has been detected, wherein the gesture event is an interface input in which the input device is moving in a predefined constrain and is within the sensing range of the surface but is not in contact with the surface.

18. The method of claim 17 further comprising:
   detecting a second motion of the electronic device; and
   detecting a hover event input responsive to the second motion of the electronic device having been detected.

19. The method of claim 18, wherein the first motion comprises a downward tilt motion.

20. The method of claim 19, wherein the second motion comprises an upward tilt motion.

21. The method of claim 17 further comprising:
   detecting a third type of interface input to the touch screen; and
   when the third type of interface input is detected, ignoring any motion of the electronic device.

22. The method of claim 21, wherein the third type of interface input comprises a touch event.

\* \* \* \* \*